(12) United States Patent  (10) Patent No.: US 8,226,174 B2
Wright                     (45) Date of Patent:     Jul. 24, 2012

(54) ECP BRAKE WITH DUAL MODE EMPTY LOAD

(75) Inventor: Eric C. Wright, Evans Mills, NY (US)

(73) Assignee: New York Air Brake Corporation, Watertown, NY (US)

( * ) Notice: Subject to any disclaimer, the term of this patent is extended or adjusted under 35 U.S.C. 154(b) by 1102 days.

(21) Appl. No.: 12/032,936

(22) Filed: Feb. 18, 2008

(65) Prior Publication Data

US 2009/0206651 A1    Aug. 20, 2009

(51) Int. Cl.
    *B60T 8/18*    (2006.01)
(52) U.S. Cl. .............. 303/22.2; 303/22.6; 303/22.5; 303/22.8; 303/22.7
(58) Field of Classification Search ............... 303/22.2, 303/22.6, 22.5, 22.8, 22.7
    See application file for complete search history.

(56) References Cited

U.S. PATENT DOCUMENTS

| | | | |
|---|---|---|---|
| 3,924,902 A * | 12/1975 | Engle | 303/132 |
| 3,970,348 A * | 7/1976 | Maskery | 303/22.7 |
| 4,080,005 A * | 3/1978 | Engle | 303/22.6 |
| 4,235,478 A * | 11/1980 | Billeter | 303/22.2 |
| 4,421,360 A | 12/1983 | Newton | |
| 4,441,764 A | 4/1984 | Newton | |
| 4,453,777 A | 6/1984 | Newton | |
| 4,776,648 A | 10/1988 | Newton et al. | |
| 5,106,168 A | 4/1992 | Mckay | |
| 5,211,450 A | 5/1993 | Gayfer et al. | |
| 5,303,987 A * | 4/1994 | McKay | 303/22.2 |
| 5,417,143 A * | 5/1995 | Pasek | 92/20 |
| 5,603,556 A | 2/1997 | Klink | |
| 5,735,580 A | 4/1998 | Klink | |
| 6,206,483 B1 | 3/2001 | LaLone | |
| 6,435,623 B1 * | 8/2002 | Peltz | 303/15 |
| 6,484,085 B2 | 11/2002 | Marra et al. | |
| 6,648,425 B2 | 11/2003 | Marra et al. | |
| 2003/0001431 A1 | 1/2003 | Vaughn | |

FOREIGN PATENT DOCUMENTS

| | | |
|---|---|---|
| DE | 36 39 149 A1 | 5/1988 |
| DE | 40 22 481 A1 | 10/1991 |
| JP | 08-268246 A | 10/1996 |

* cited by examiner

*Primary Examiner* — Bradley King
*Assistant Examiner* — Mahbubur Rashid

(57) ABSTRACT

A rail vehicle brake system includes an electric controlled pneumatic brake valve having a controller and includes an empty-load device connecting the brake valve to a brake device. An electro-pneumatic lock-out valve is controlled by the controller and has a first position which allows the proportioning of the inlet pressure to the outlet by the empty-load device and a lock-out position which pneumatically prevents the proportioning of the inlet pressure to the outlet by the empty-load device. Also, the system may include a sensor for sensing the vehicle load; and the controller controls the brake valve in response to the sensed load taking into account the operation of the change over valve of the empty-load device. Also, an empty-load device including a load sensor is disclosed.

12 Claims, 6 Drawing Sheets

ECP BRAKE WITH DUAL MODE EMPTY LOAD

BACKGROUND AND SUMMARY OF THE DISCLOSURE

The present disclosure relates generally to empty-load devices of rail brake system and more specifically to empty-load devices which can be used in a pneumatic and electrically controlled pneumatic (ECP) rail brake system.

A dual-mode empty-load (EL) system is disclosed, which provides EL function in both ECP and AAR-standard pneumatic modes. As is well known, an AAR standard empty-load system operates in response to brake cylinder pressure to determine car loading by measuring spring deflection of the bogie and act to reduce the brake cylinder pressure in the empty car state by means of a proportioning valve and related empty-load displacement volume. In the loaded state, the empty-load system bypasses the proportioning valve and volume, so the full pressure of brake cylinder air is delivered to the brake cylinder.

A typical empty-load valve is New York Air Brake's EL-60 or SC-1 and U.S. Pat. No. 5,211,450 to Gayfer et al., in a single housing. Another patent to Gayfer et al., U.S. Pat. No. 6,666,528, shows the load sensing and the proportion valve being in two different housings. Both these patents are incorporated herein by reference. In each of these, an arm is used to sense the displacement between the car body and the truck as an indication of weight. For bulk commodity cars, the load sensing is through the wall of the bin wherein the contents of the car press on a membrane which is in communication with the device. This type of device is exemplified by the Beacon U.S. Pat. No. 3,960,411. A device disclosed by Beacon et al., U.S. Pat. No. 5,039,174, shows the same structure used for bulk commodity cars as well as those which measure the load by the displacement between the truck and the car body.

In ECP operation, the empty or load brake pressure regulation is provided by the ECP Car Control Device (CCD). Empty-Load status of the car is communicated electronically to the CCD alternatively as a train set-up variable input by the train driver in the controlling or lead locomotive or by means of an electronic or electro-mechanical empty-load device on each car. See for example U.S. Pat. No. 6,484,085 and U.S. Pat. No. 6,648,425. Head-end empty-load control is typically used for bulk-commodity unit trains which are either completely empty or completely full, while on-car sensors can be used for mixed freight trains and for inter-modal cars, for which the car loading may differ from car to car in the train.

Although an ECP train requires only electronic empty-load while operating in ECP mode, the system includes a pneumatic emergency brake back-up mode in the event of complete failure of the train ECP brake control. In this mode, pneumatic empty-load function is required to prevent wheel damage on empty cars by over braking. But as already described, prior art pneumatic empty-load systems regulate the output of the brake control valve, while the ECP system produces the correct pressure directly. If a prior art empty load system is installed on a car with ECP then in the empty state, the ECP would produce the correct (lower) brake pressure, and the pneumatic empty-load would further reduce that pressure by means of the aforementioned proportioning valve and volume. The result is less braking then desired.

A rail vehicle brake system according to the present disclosure includes an electrically controlled pneumatic brake valve connected to a brake pipe and having a controller connected to a network, and an empty-load device connecting the brake valve to a brake device. The empty-load device includes an inlet to receive a brake signal from the brake valve, an outlet for a brake device, a load sensing element, a change over valve for proportioning the pressure at the inlet and the outlet when empty is sensed by the load sensing element, and a differential pressure element connecting the load sensing element and the change over valve. An electro-pneumatic lock-out valve is controlled by the controller and has a first position which allows the proportioning of the inlet pressure to the outlet and a lock-out position which pneumatically prevents the proportioning of the inlet pressure to the outlet.

The controller controls the lock-out valve in responsive to an empty-load signal on the network. Alternatively, the brake system may include a sensor for sensing the vehicle load and wherein the controller is connected to the sensor and controls the lock-out valve in responsive to the sensed load. The sensor may sense the position of the load sensing element of the empty-load device. The sensor may be connected to the controller by the network. The lock-out valve and/or the sensor may be mounted to the empty-load device.

The lock-out valve may be connected in parallel to the change over valve with respect to the inlet and outlet. Alternatively, the lock-out valve may be connected in parallel to both sides of the differential pressure element. The lock-out valve is spring biased to the first position. The controller may control the lock-out valve to the lock-out position only when a brake command for an empty car is present.

In another embodiment, the rail vehicle brake system includes the electrically controlled pneumatic brake valve connected to a brake pipe and having the controller, and an empty-load device connecting the brake valve to a brake device. A sensor is connected to the controller for sensing the vehicle load; and the controller controls the brake valve in response to the sensed load taking into account the operation of the change over valve.

The sensor may sense the position of the load sensing element of the empty-load device. The load sensing element may have a stepped profile and the controller determines an empty condition or a loaded condition as a function of the steps position relative to the sensor. Alternatively, the load sensing element have a plural stepped profile or tapered profile and the controller determines the degree of load as a function of the steps or taper position relative to the sensor, wherein the travel of the load sensing element is proportional to car load.

An empty-load device includes an inlet to receive a brake signal and an outlet for a brake device. A load sensing element and a change over valve, for proportioning the pressure at the inlet and the outlet when empty is sensed by the load sensing element, is provided. A differential pressure element connects the load sensing element and the change over valve. A sensor senses the position of the load sensing element of the empty/load device.

Other objects, advantages and novel features of the present invention will become apparent from the following detailed description when considered in conjunction with the accompanying drawings.

BRIEF DESCRIPTION OF THE DRAWINGS

FIG. 7 is a cross-sectional view of another modification of the sensor portion of the empty-load device.

DETAILED DESCRIPTION OF THE DRAWINGS

Figure 1:
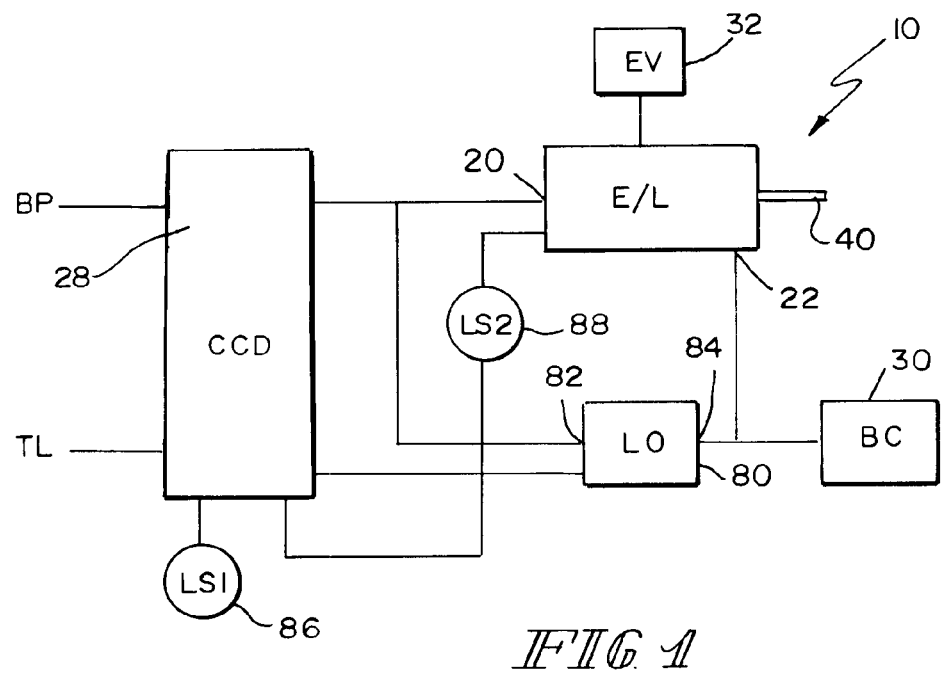
FIG. 1 is a schematic of portions of a train brake system with a first embodiment of an empty-load device according to the present disclosure.
Figure 2:
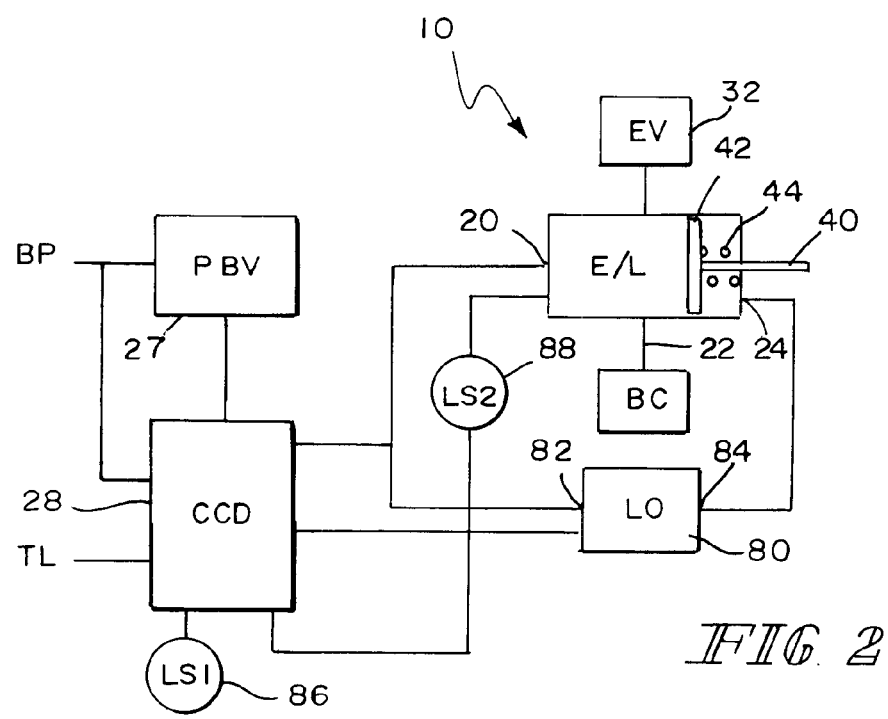
FIG. 2 is a schematic of portions of a train brake system with a second embodiment of an empty-load device according to the present disclosure.

As is well-known in the industry and as illustrated in FIGS. 1 and 2, an ECP car brake system includes an electro pneumatic brake valve or car control device CCD 28 which provides a brake control signal to the brake cylinder 30 through an empty-load device 10. The brake signal from the CCD 28 is provided at inlet 20 of the empty-load device E/L 10 and the appropriate brake cylinder pressure is provided at outlet 22 from the empty-load device 10 to the brake cylinder BC 30. The empty-load device 10 includes a load sensing device, shown as a push rod or actuator 40. The position of the actuator 40 is determined by the load of the car. Actuator 40 may be connected to an element that senses the position of the car body resulting from the suspension spring deflection or may be connected to a wall of a commodity car to sense the weight of the commodity within the bin. The load sensed by the actuator 40 controls a change over device or valve in the empty load valve 10 which proportions the input signal at inlet 20 by providing air to the equalizing volume EV 32 for an empty load. This provides a smaller signal at outlet 22 to the brake cylinder 30.

In an ECP train, the CCD 28 is connected to the brake pipe BP and responds to an emergency signal on the brake pipe BP. The CCD 28 includes a controller which is responsive to electrical brake signals on a train line TL to control the pneumatic brake signal or pressure for both service and emergency braking.

A lock-out mechanism 80 is shown in FIGS. 1 and 2 controlled by the controller CCD 28. For ECP mode of operation of the car brake system, the lock-out device 80 disables the proportioning of the empty-load device 10. Thus, the pneumatic pressure at the outlet 22 of the empty-load device 10 is the same as at the inlet 20. The controller in the CCD 28 may receive the empty-load condition of the car/train from the head end over the train line TL or the empty-load condition of the car from a load sensor LS 86 on the car. In either case, the controller CCD 28 proportions the brake signal to the brake cylinder as appropriate for the empty-loaded state of the car. For a pneumatic emergency brake application or failure of the CCD 28, the lock-out device 80 is deactivated and the empty-load device 10 performs proportioning appropriate to the empty-loaded state of the car.

As illustrated, a second load sensor LS2 88 may be provided which senses the empty-load condition of the empty-load device 10. The controller CCD 28 can then take into account the load sensed by the empty-load device 10 and load sensor LS2 88 or its proportioning condition in providing brake signals. If the lock-out device 80 is deactivated or not part of or connected to the empty-load device 10, the controller CCD 28 provides an un-proportioned brake signal to be proportioned by the empty-load device 10 for an empty condition. If the lock-out device 80 is activated, the controller CCD 28 provides a proportioned brake signal for an empty condition.

In the first embodiment of FIG. 1, the lock-out device 80 is connected between the inlet 20 and the outlet 22 of the empty-load device 10. The lock-out device is connected in parallel to the change over valve and thus pneumatically prevents the reapportionment of the pressured inlet 20 the pressured outlet 22. Thus no matter what the weight of the car is and the position of the change over valve, it is being bypassed by the lock-out device 80.

In a second embodiment illustrated in FIG. 2, the lock-out device 80 is connected between inlet pressure 20 of the empty-load device 10 and port 24 on the non-pressurized side of the differential pressure element 42 which is connected to the actuator load sensing element or push rod 40. As is well-known, the pressurized side of the differential pressure element 42 is connected to the same chamber as the outlet 22 of the empty-load device 10. A spring 44 of the differential pressure element 42 maintains the actuator 40 recessed into the empty-load device 10 with no pressure. The actuator 40 can not sense the load without pressure being on its pressurized side.

In FIG. 1, the electro pneumatic brake valve or CCD 28 is shown as a stand alone device or brake valve system and is the only brake control on the car. In FIG. 2, the CCD 28 is shown as an overlay system having a pneumatic brake valve PBV 27, for example a DB-60 and a separate controller CCD 28. In an overlay system, the brakes are controlled by the CCD 28 when operating in ECP mode and are controlled by the pneumatic brake control valve PBV 27 when in pneumatic mode. There are other overlay systems where controller CCD 28 is integral to a standard brake control valve. The present lockout system may be used with any type of ECP brake valve. Examples are shown in U.S. Pat. Nos. 5,676,431; 5,967,620 and 5,988,766. Also, either the stand alone or overlay system can be used in FIGS. 1 and 2.

Initially, the empty-load device 10 allows input pressure 20 to flow to the outlet 22 and would normally move the differential pressure element 42 to the right in FIG. 2 extending the actuator 40 of the load sensing element after overcoming the spring 44. Depending upon the position of the actuator 40, the change over valve will or will not actuate. With the lock-out device 80 connecting the pressure at the inlet 20 to the non-pressurized side of the pressure differential element 42, the initial pressure of the differential pressure element 42 will be locked in its non-extended position. Thus the change over valve will not change over regardless of the load, since the actuator 40 will not be extended to sense the load.

As will be explained in detail with respect to FIGS. 3 through 7, the lock-out device 80 includes a lock-out valve 80a whose position determines the connection of the inlet 82 of the lock-out device 80 and its outlet 84. Normally, valve 80a prevents connection of the inlet 82 to the outlet 84 and the empty load device 10 operates an empty-load device. In the lock-out position, the lock-out valve 80a connects the inlet 82 to the outlet 84. A spring 90 (not shown in FIGS. 1 and 2) biases the lock-out valve 80a from its lock-out position.

Thus it can be seen that a simple lock-out device is shown which pneumatically prevents the proportioning of the inlet pressure to the outlet pressure of the empty-load device 10, while lock-out valve 80a is in its locked out position.

The lock-out device 80 may be a standalone device connected to the inlet 20 and the outlet 22 by T connections. Alternatively, the connection of the outlet 84 of the lock-out device 80 may be connected to the brake cylinder test port shown in U.S. Pat. No. 6,206,483. Alternatively, the lock-out device 80 may be mounted and become an integral part of the empty-load device 10 and the connections of the inlet 82 and the outlet 84 of the lock-out device 80 may be by external connections or internal connections with additional ports provided in the casing of the empty-load device 10.

The integral versions are shown in FIGS. 3-7. It includes a housing 12 having first housing portion 14 joined to a second housing portion 16 by fasteners. The empty-load device 10 includes a control valve port or inlet 20, a brake cylinder port or outlet 22, an equalizing volume port 24 and exhaust port 26.

A control or pneumatic brake valve 28 is connected to control valve port 20. The brake cylinder 30 is connected to brake cylinder port 22; and an equalizing volume 32 is mounted to the housing portion 16 and connected to equalizing volume port 24.

A load-sensing lever 34 is pivotally connected at 36 to the housing portion 14 and is also pivotally connected at 38 to a push rod 40 extending from the housing portion 14. The sensing lever 34 contacts a portion of an unloaded structure of a railroad car track to sense the load force of the car.

A sensing piston or differential pressure element 42 includes a pair of members which are connected to the body 12 by a diaphragm. The sensing piston 42 is secured to the push rod 40 between a shoulder 41 on the push rod and a threaded fastener 43. A spring 44 extends between the housing portion 14 and a face of the sensing piston 42 and biases the sensing piston 42 to the right in FIGS. 3-7.

The push rod 40 includes an actuator 46 threadably received therein and extending through a ratio piston or change over valve 48. The ratio piston 48 includes a first surface 50 facing a surface of the sensing piston 42 with the brake cylinder port 22 there between. A second surface 52 of the ratio portion 40 is smaller than the first surface 50. A ratio valve, which bypasses the ratio piston when open, is mounted on and travels with the ratio piston 48. The ratio valve includes a valve seat 54 in the smaller surface 52 of the ratio valve seat 48, a valving member 56, a biasing spring 58, a spring cage 60, and retainer 62. The ratio valve as illustrated is a check valve which is responsive to the position of the actuator portion 46 of the push rod 40 as well as the differential pressure there across.

The housing portion 16 includes a first bore 64 and a second smaller bore 66 to receive the ratio piston 48. The end wall of bore 66 acts as a stop for the ratio piston 48 in its release or loaded position. A stop ring 68 is provided in the larger bore 64 as a stop adjacent to the empty-load position. The exterior surface of the ratio piston 48 is separated from the internal bores 64 and 66 to create a space 71 there between which is sealed by seals 70 and 72. With the ratio piston 48 in the release or the loaded load position, the internal space 71 connects the equalizing volume port 24 with the exhaust port 26 and disconnects the equalizing port 24 from the control valve port 20. When the ratio piston 48 is moved to its empty-load position, the internal space 71 is connected only to the exhaust port 26 and the equalization volume port 24 is disconnected from the exhaust port 26 and is connected to the control valve port 20.

For the specific operation of the empty-load device illustrated in FIGS. 3-7, reference is made to U.S. Pat. No. 5,211,450 which is incorporated herein by reference.

A novel empty-load system is disclosed which provides an empty-load system having the known functionality of the prior art with an additional means to disable the proportioning function while in ECP mode, and optionally with the addition of an integrated electronic or electro-mechanical sensor to the empty-load valve to provide the electronic load signal to the CCD 29.

Figure 3:
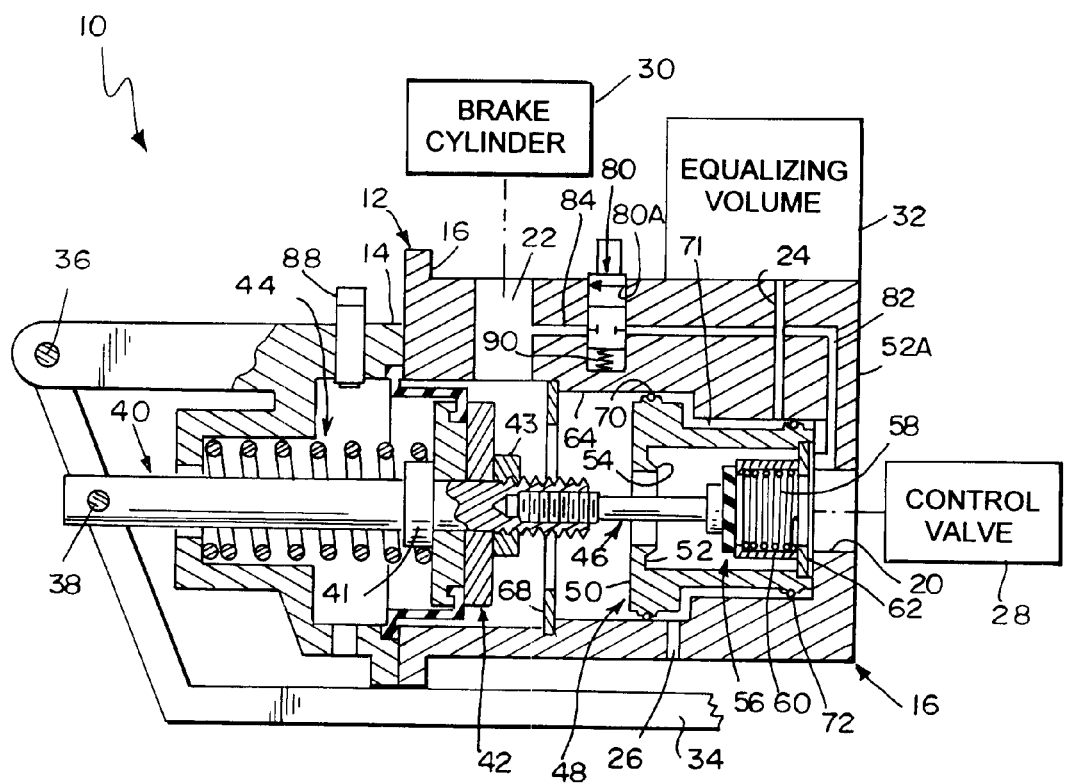
FIG. 3 is a cross-sectional view of the first embodiment of an empty-load device in the brake released position.
Figure 5:
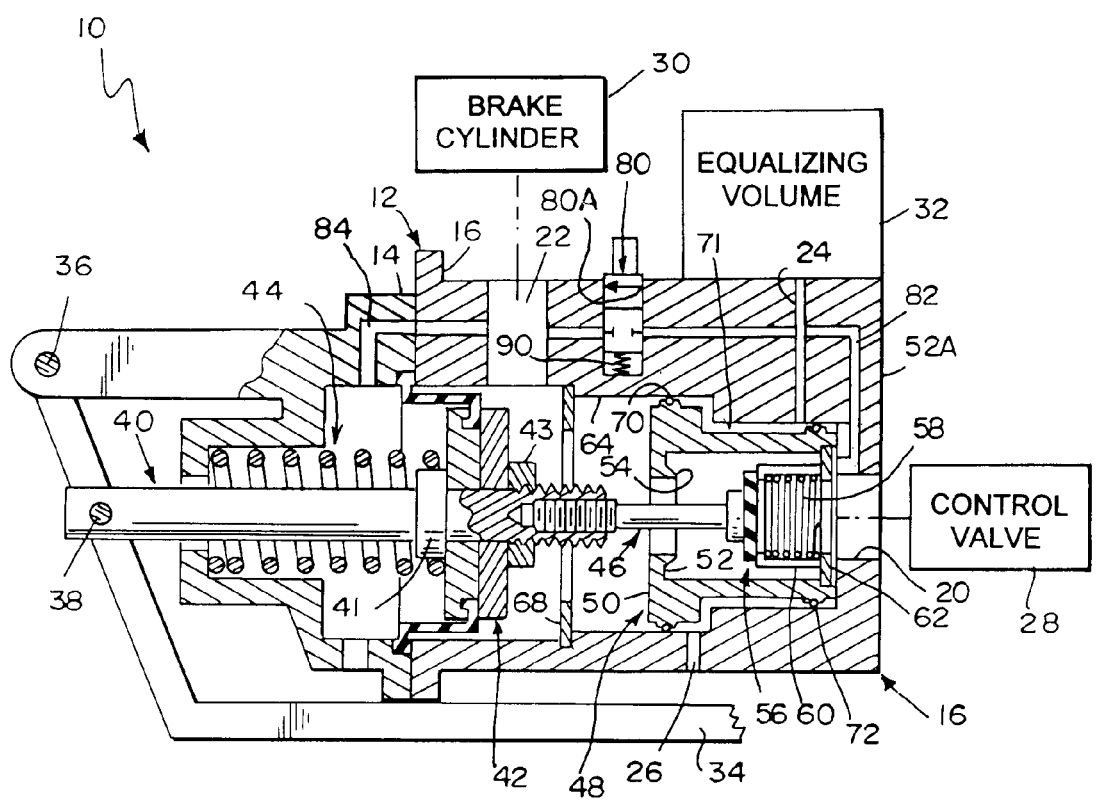
FIG. 5 is a cross-sectional view of the second embodiment of an empty-load device.
Figure 6:
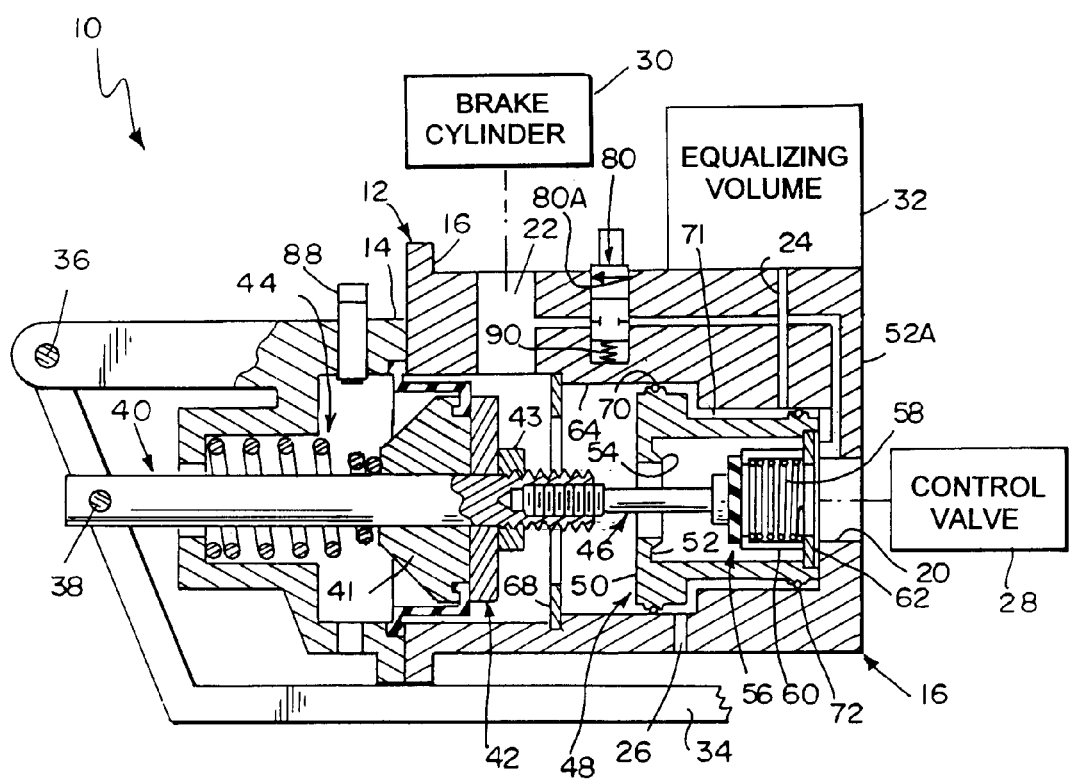
FIG. 6 is a cross-sectional view of a modification of the sensor portion of the empty-load device.
Figure 1:
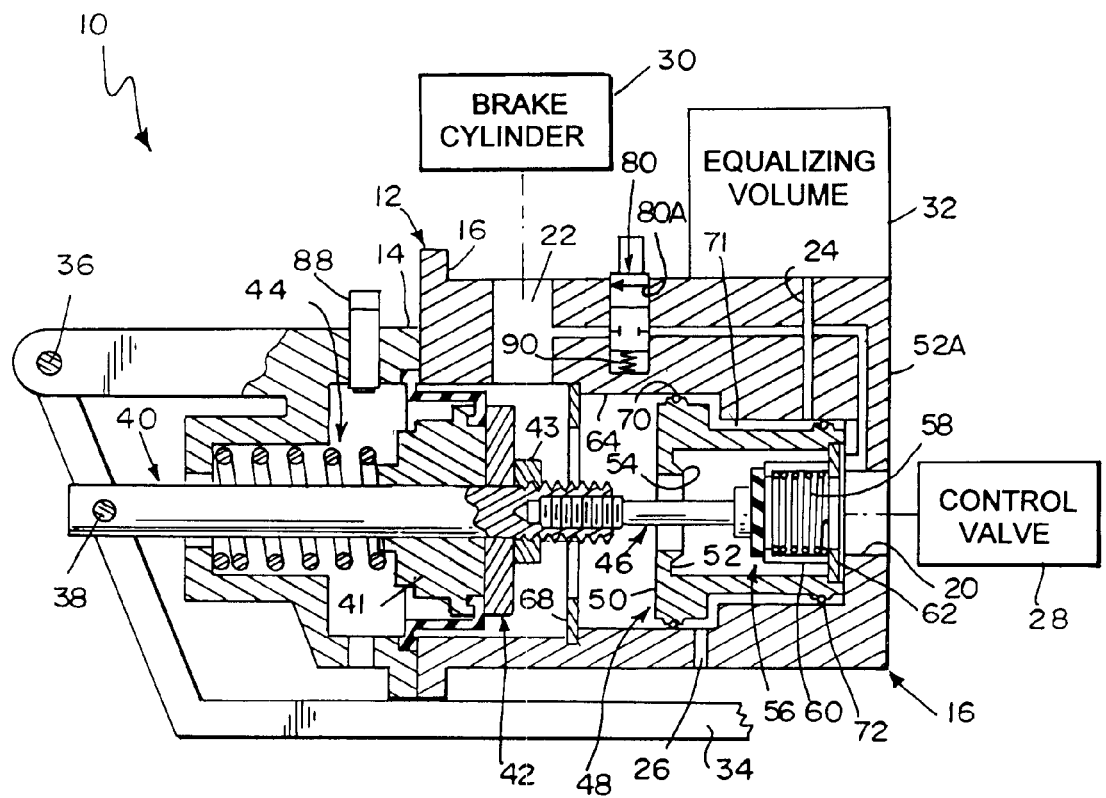

To provide ECP-controlled nullification of the empty-mode pressure modulation of the empty-load proportioning function, an electro-pneumatic lock-out valve 80, shown as a small, low-power solenoid valve, is provided in the empty load device 10. When energized, the valve 80 opens a pneumatic connection between the front side 82 and the back-side 84 of the change over valve 48 as shown in FIG. 3, rendering it inoperative. When the solenoid 80 is de-energized, the passage is closed and the change over valve 48 can operate in the usual manner. In FIG. 5, the solenoid 80 is connected across the sensing piston 42 and renders it inoperative when the solenoid is energized. This prevents the change over valve 48 from operating since the ratio valve is kept open.

Because the solenoid 80 is normally-closed when de-energized by spring 90, loss of power to the ECP system will result in the solenoid 80 closing so that the empty-load valve 10 operates in pneumatic mode. During ECP operation, the ECP system energizes the solenoid 80, nullifying the pneumatic change over valve 48 so the CCD 29 controls the brake pressure directly. To conserve power, because the CCD 29 is a smart device, in addition to using a low powered solenoid, the solenoid 80 can optionally be controlled to be energized by the CCD 29 only when there is a brake call and further only when there is a brake call on an empty car.

Figure 4:
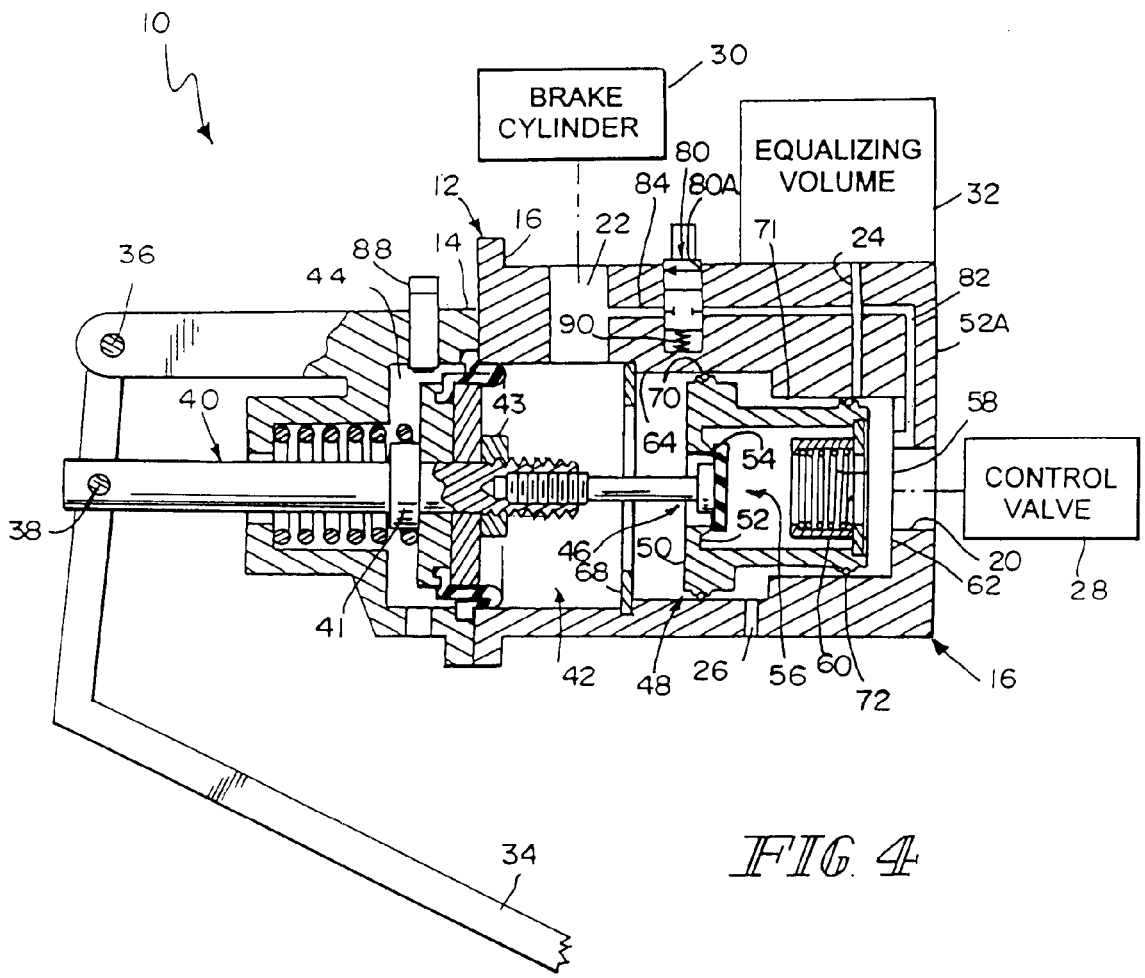
FIG. 4 is a cross-sectional view of the first embodiment of the empty-load device in the empty position.

Optionally or alternatively, the empty-load device 10 with ECP controlled nullification can be provided with integrated electronic or electromechanical position sensing to provide an electric or electronic signal indicative of the empty or loaded status. The sensing could be provided by the addition of a proximity-type sensor 88 aligned to sense a diameter change on the empty-load sensor stem or load sensing element 40. As shown in FIG. 3, the stem 40 is adjacent the sensor 88, indicating a un-activated or load condition. In FIG. 4, the increased diameter of shoulder 41 is adjacent the sensor 88, indicating an empty condition.

While a single, cylindrical diameter change of FIGS. 3 and 4 would be sufficient to provide an empty-load signal, a conical (FIG. 6) or multi-step (FIG. 7), axial cylindrical diameter change would provide a variable load signal to the ECP, so that the CCD 29 could calculate and provide precisely the right amount of braking pressure to brake the actual car weight. Alternatively, the sensing could be provided by a linear or rotary potentiometer or any other of the well known position sensing technologies.

The electrical signal could be wired to the CCD 29 where the analog signal could be read and acted upon. Alternatively, a communication bus, like the Echelon FTT-11 Link Power transceiver could be provided. Thus, the signal conditioning and conversion to a digital message using a communication protocol is done at the dual mode empty load device by integrating a Neuron' processor, FTT-11 transceiver and related circuitry. That empty load electronic can be powered by the FTT-10 Link Power, which also provides the physical means for communication to the CCD. That same electronic could provide the actuation control of the lock-out device 10 as described above.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. A rail vehicle brake system comprising:
   an electrically controlled pneumatic brake valve connected to a brake pipe and including a controller connected to a network;
   an empty-load device connecting the brake valve to a brake device;
   the empty-load device including an inlet to receive a brake signal from the brake valve, an outlet for the brake device, a load sensing element, a change over valve for proportioning pneumatic pressure at the inlet and the outlet when empty is sensed by the load sensing element, and a differential pressure element connecting the load sensing element and the change over valve; and an electro-pneumatic lock-out valve controlled by the controller and having a first position which allows the proportioning of the inlet pressure to the outlet and a lock-out position which pneumatically prevents the proportioning of the inlet pressure to the outlet.

2. The rail vehicle brake system of claim 1, wherein the controller controls the lock-out valve in responsive to an empty-load signal on the network.

3. The rail vehicle brake system of claim 1, including a sensor for sensing the vehicle load and wherein the controller is connected to the sensor and controls the lock-out valve in response to the sensed load.

4. The rail vehicle brake system of claim 3, wherein the sensor senses the position of the load sensing element of the empty-load device.

5. The rail vehicle brake system of claim 3, wherein the sensor is connected to the controller by the network.

6. The rail vehicle brake system of claim 3, wherein the lock-out valve and the sensor is mounted to the empty-load device.

7. The rail vehicle brake system of claim 1, wherein the lock-out valve is mounted to the empty-load device.

8. The rail vehicle brake system of claim 1, wherein the lock-out valve is connected in parallel to the change over valve with respect to the inlet and outlet.

9. The rail vehicle brake system of claim 1, wherein the lock-out valve is connected in parallel to both sides of the differential pressure element.

10. The rail vehicle brake system of claim 1, wherein the lock-out valve is spring biased to the first position.

11. The rail vehicle brake system of claim 10, wherein the controller controls the lock-out valve to the lock-out position only when a brake command for an empty car is present.

12. The rail vehicle brake system of claim 1, wherein the electrically controlled pneumatic brake valve is one of an integral brake valve having the controller and pneumatic valves as a unit and an overlay brake valve having a stand alone pneumatic brake valve with the controller as an overlay.

* * * * *